US012812393B2

(12) United States Patent
Cho et al.

(10) Patent No.: US 12,812,393 B2
(45) Date of Patent: Nov. 24, 2026

(54) SEMI-DISTRIBUTED SPECTRUM SENSING METHOD AND APPARATUS IN COGNITIVE INTERNET OF THINGS NETWORKS

(71) Applicant: CHUNG ANG UNIVERSITY INDUSTRY ACADEMIC COOPERATION FOUNDATION, Seoul (KR)

(72) Inventors: Sung Rae Cho, Seongnam-si (KR); Chung Hyun Lee, Seoul (KR); Dong Hyun Lee, Seoul (KR); Jun Suk Oh, Seoul (KR)

(73) Assignee: CHUNG ANG UNIVERSITY INDUSTRY ACADEMIC COOPERATION FOUNDATION, Seoul (KR)

( * ) Notice: Subject to any disclaimer, the term of this patent is extended or adjusted under 35 U.S.C. 154(b) by 305 days.

(21) Appl. No.: 18/409,583

(22) Filed: Jan. 10, 2024

(65) Prior Publication Data

US 2024/0236693 A1 Jul. 11, 2024

(30) Foreign Application Priority Data

Nov. 30, 2022 (KR) ........................ 10-2022-0163697
Jan. 9, 2023 (KR) ........................ 10-2023-0002627

(51) Int. Cl.
*H04W 16/14* (2009.01)
*H04W 16/28* (2009.01)
*H04W 84/18* (2009.01)

(52) U.S. Cl.
CPC ........... *H04W 16/14* (2013.01); *H04W 16/28* (2013.01); *H04W 84/18* (2013.01)

(58) Field of Classification Search
None
See application file for complete search history.

(56) References Cited

U.S. PATENT DOCUMENTS

| | | | | |
|---|---|---|---|---|
| 9,320,047 B2 * | 4/2016 | Li | ........................ | H04W 72/542 |
| 2009/0221295 A1 * | 9/2009 | Sahin | .................... | H04L 5/0044 455/450 |
| 2011/0237243 A1 * | 9/2011 | Guvenc | ............... | H04W 72/542 455/423 |
| 2021/0156978 A1 * | 5/2021 | Nicholls | ................. | G01S 7/025 |

FOREIGN PATENT DOCUMENTS

| | | | | |
|---|---|---|---|---|
| CN | 113948868 A * | 1/2022 | .......... | H04W 88/085 |
| CN | 110402610 B * | 1/2023 | ............ | H04W 16/28 |
| KR | 10-1603036 | 3/2016 | | |
| KR | 10-2018-0014271 | 2/2018 | | |
| WO | WO-2020263507 A1 * | 12/2020 | ......... | H04B 7/06952 |

* cited by examiner

*Primary Examiner* — Eunsook Choi

(57) ABSTRACT

Disclosed are a semi-distributed spectrum sensing method in cognitive IoT networks, and an apparatus thereof. The semi-distributed spectrum sensing method in cognitive IoT networks includes: (a) grouping, based on local information of pre-shared secondary terminals, each secondary terminal into each local cluster; (b) generating overlapping point information by calculating an overlapping range between directional antenna beams of the respective secondary terminals in the each local cluster, and determining a beam determination binary indicator of the each secondary terminal by using the overlapping point information; and (c) calculating and adjusting the overlapping range between the respective local clusters.

10 Claims, 17 Drawing Sheets

FIG. 7

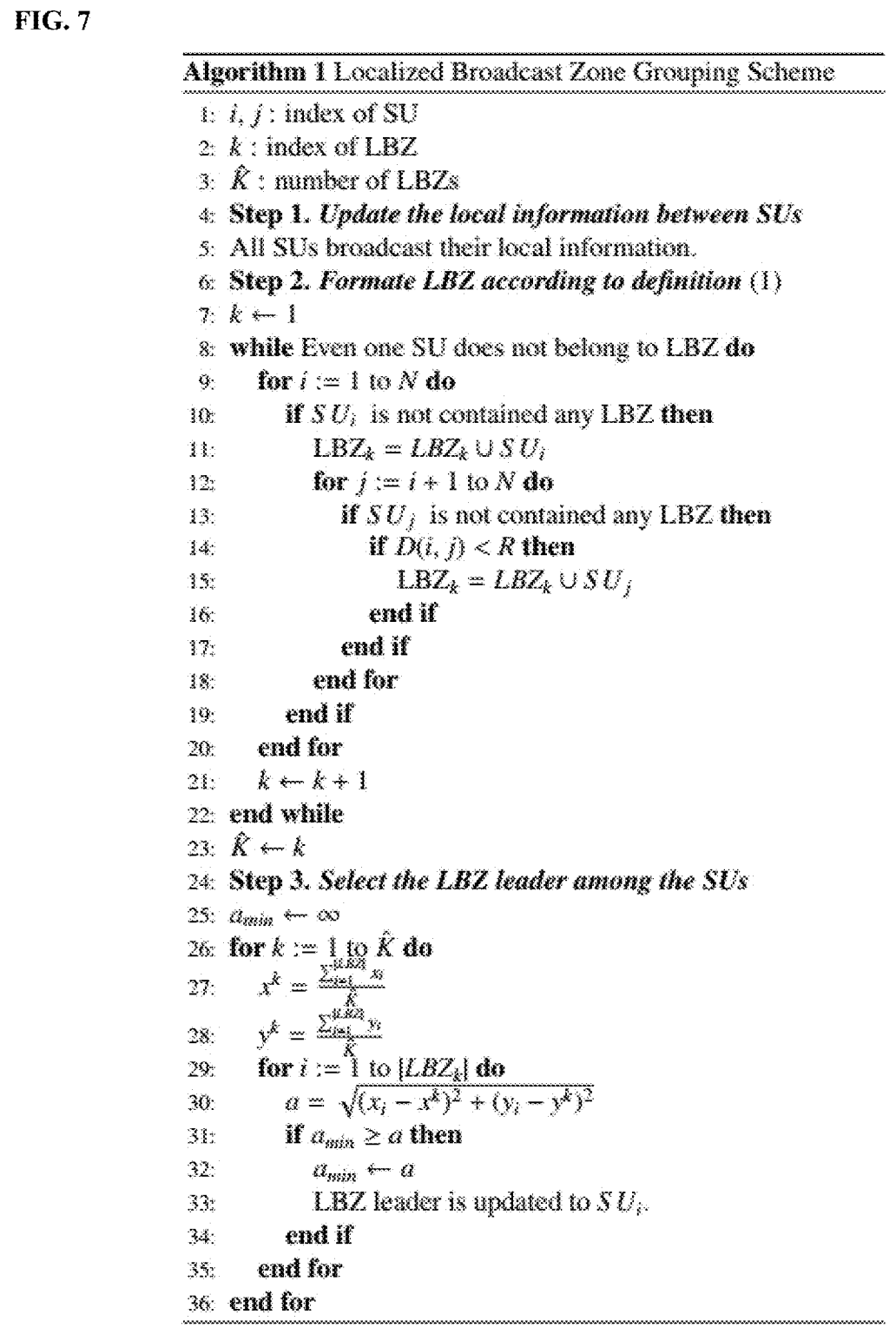

Algorithm 1 Localized Broadcast Zone Grouping Scheme $i, j$ : index of SU
$k$ : index of LBZ
$\hat{K}$ : number of LBZs
Step 1. *Update the local information between SUs*
All SUs broadcast their local information.
Step 2. *Formate LBZ according to definition* (1)
$k \leftarrow 1$
while Even one SU does not belong to LBZ do
  for $i := 1$ to $N$ do
    if $SU_i$ is not contained any LBZ then
      $\text{LBZ}_k = LBZ_k \cup SU_i$
      for $j := i + 1$ to $N$ do
        if $SU_j$ is not contained any LBZ then
          if $D(i, j) < R$ then
            $\text{LBZ}_k = LBZ_k \cup SU_j$
          end if
        end if
      end for
    end if
  end for
  $k \leftarrow k + 1$
end while
$\hat{K} \leftarrow k$
Step 3. *Select the LBZ leader among the SUs*
$a_{min} \leftarrow \infty$
for $k := 1$ to $\hat{K}$ do
  $x^k = \frac{\sum_{i=1}^{|LBZ|} x_i}{K}$
  $y^k = \frac{\sum_{i=1}^{|LBZ|} y_i}{K}$
  for $i := 1$ to $|LBZ_k|$ do
    $a = \sqrt{(x_i - x^k)^2 + (y_i - y^k)^2}$
    if $a_{min} \geq a$ then
      $a_{min} \leftarrow a$
      LBZ leader is updated to $SU_i$.
    end if
  end for
end for

FIG. 9

Algorithm 2 Finding Overlapping Points for $\mathrm{LBZ}_k$ $i, m$: index of two distinct SUs in $\mathrm{LBZ}_k$
$j, n$: index of beams of two distinct SUs
$a, b$: index of equation of two distinct beams
$d$: index of information of intersection point
$k$: index of LBZ
$E^i_{j,a}(x)$: equation if $a = 1$ then $L^i_{j,1}(x)$, else if $a = 2$ then $L^i_{j,2}(x)$, else if $a = 3$ then $R_{i,j}(x)$
for $i := 1$ to $|\ \mathrm{LBZ}_k\ |$ do
  for $m := i + 1$ to $|\ \mathrm{LBZ}_k\ |$ do
    if $\sqrt{|x_i - x_m|^2 + |y_i - y_m|^2} < r_i + r_m$ then
      $d \leftarrow 1$
      For all $i, j, m, n$ of $\mathrm{SU}_{i,j}$, $\mathrm{SU}_{m,n}$,
      if $\exists x$ s.t. $|E^i_{j,a}(x) - E^m_{n,b}(x)| = 0$ then
        $p_d \leftarrow x$
        $q_{d-1} \leftarrow x$
        if $E^i_{p,a}(p_d + \epsilon) > E^j_{q,b}(p_d + \epsilon)$ then
          $E^U_d \leftarrow E^i_{j,a}(x)$
          $E^L_d \leftarrow E^m_{n,b}(x)$
        else
          $E^U_d \leftarrow E^j_{i,b}(x)$
          $E^L_d \leftarrow E^i_{j,a}(x)$
        end if
        $d \leftarrow d + 1$
      end if
    end if
    Sorting $i_d$ in ascending order.
  end for
end for

FIG. 11

Algorithm 3 Modified Elimination Approach to Solve (P2)

1: Input : Problem (P2)
2: Constraints : (8), (9), (10)
3: Solve Procedure :
4: For all $\mathrm{SU}_{i,j}$, it is divided into sets of overlapping beams based on $O_{i,j}$.
5: Then, $s_{i,j}$ can be determined (8), (9) since the only one beam will be turn on which have the largest value in each set (10).
6: The optimal solution is obtained by summing all derived $s_{i,j}$.
7: Output : Optimal Solution $S^*$ of (P2)

FIG. 12

Algorithm 4 Localized Broadcast Zone Coordination $i, j$ : index of SU in connectivity table
$m, n$ : index of beam
$k, l$ : index of LBZ
$\hat{K}$ : number of LBZs
Step 1. *Sharing connectivity table between LBZs*
$\forall$ $LBZ_k$, broadcast their sensing information and connectivity table using LoRa.
Step 2. *Validation overlapping of beam direction*
for $k := 1$ to $\hat{K}$ do
    for $l := k + 1$ to $\hat{K}$ do
        if PS of $LBZ_k$ == PS of $LBZ_l$ then
            for $i := 1$ to $|LBZ_k|$ do
                Check whether overlap with $SU_j$ in $LBZ_l$ or not based on $D(i, j) < R, \forall j$.
                if $\forall m, n$, $SU_{i,m}$ and $SU_{j,n}$ are overlapped then
                    if $\Psi_{i,m} \geq \Psi_{j,n}$ then
                        $s_{i,m} \leftarrow 0$
                    else
                        $s_{j,m} \leftarrow 0$
                    end if
                end if
            end for
        end if
    end for
end for
Step 3. *Update for next sensing and transmission*
Update and store the sharing sensing information and connectivity table.
Shift PS for next cycle.

SEMI-DISTRIBUTED SPECTRUM SENSING METHOD AND APPARATUS IN COGNITIVE INTERNET OF THINGS NETWORKS

CROSS-REFERENCE TO RELATED APPLICATION

This application claims under 35 U.S.C. § 119(a) the benefit of Korean Patent Application Nos. 10-2022-0163697 filed on Nov. 30, 2022, and 10-2023-0002627 filed on Jan. 9, 2023, the entire contents of which are incorporated herein by reference.

BACKGROUND

(a) Technical Field

The present invention relates to a semi-distributed spectrum sensing method in cognitive IoTs networks, and an apparatus thereof.

(b) Background Art

A technology is spectrum sensing, which detects whether to use a primary user (PU) for which a secondary user (SU) has use priority to solve Internet of Things (IoT) which explosively increases in a wireless cognitive network and the resulting limited frequency resource problem. The SU may search a time or a frequency not used by the PU through the spectrum sensing to efficiently use the frequency without a waste. This spectrum sensing is largely classified into a centralized version and a distributed version, and this is distinguished according to whether a central device integrally calculates and determines a sensing strategy and a data transmission strategy or whether the SU individually determines each of the sensing strategy and the data transmission strategy.

In respect to a conventional spectrum sensing technology, the centralized version spectrum sensing technology is much better in terms of performance, but when a load received by the central device is too large, and a problem occurs in the central device or the central device receives a security attack, there is a disadvantage in that the entire system is incapacitated.

SUMMARY OF THE DISCLOSURE

It is an object of the present disclosure to provide a semi-distributed spectrum sensing method in cognitive IoT networks, and an apparatus thereof.

It is another object of the present disclosure to provide a semi-distributed spectrum sensing method in cognitive IoT networks having performance equal to centralized sensing technology through an inter-cluster mediation step after converting from a centralized spectrum sensing model to a distributed spectrum sensing model by clustering a wireless cognitive network system into a plurality of clusters, and an apparatus thereof.

It is still another object of the present disclosure to provide a semi-distributed spectrum sensing method in cognitive Internet of Things (IoT) networks, which is capable of increasing overall network frequency resource efficiency, and an apparatus thereof.

According to an aspect of the present disclosure, provided is a semi-distributed spectrum sensing method in cognitive IoT networks.

According to an embodiment of the present disclosure, the semi-distributed spectrum sensing method in cognitive IoT networks may be provided, the method including: (a) grouping, based on local information of pre-shared secondary terminals, each secondary terminal into each local cluster; (b) generating overlapping point information by calculating an overlapping range between directional antenna beams of the respective secondary terminals in the each local cluster, and determining a beam determination binary indicator of the each secondary terminal by using the overlapping point information; and (c) calculating and adjusting the overlapping range between the respective local clusters.

The semi-distributed spectrum sensing method may further include, before step (a) above, broadcasting, by each of secondary terminals that constitute a wireless cognitive network system, local information, and the each secondary terminal may be fixed to a static position, and may include a directional antenna having M directional beam directions, wherein M is a natural number of 2 or greater.

In the grouping of each secondary terminal to each local cluster, the each secondary terminal may be grouped into each local cluster based on a distance between the secondary terminals.

The beam determination binary indicator may indicate on or off of a directional beam direction of the each secondary terminal, and only a beam direction of any one of the beams of the respective secondary terminals overlapped in the overlapping range may be determined to be on.

The beam determination binary indicator may be determined by further considering an energy detection threshold value derived based on a sensing probability for the primary terminal.

in step (c) above, the each local cluster may broadcast sensing information, and calculate an overlapping range for a channel detecting the same primary terminal, and then turn off a beam determination binary indicator of a secondary terminal corresponding to a smaller beam among the overlapped beams.

According to another aspect of the present disclosure, provided is a semi-distributed spectrum sensing apparatus in cognitive IoT networks.

According to an embodiment of the present disclosure, a semi-distributed spectrum sensing apparatus in cognitive IoT networks is provided, the apparatus including: a cluster configuration unit configuring the local cluster based on a signal acquired in an initial broadcast process; an overlapping range calculation unit generating overlapping point information by calculating an overlapping range between directional antenna beams of another secondary terminal, and determining a beam determination binary indicator of M beam directions by using the overlapping point information; and an adjustment unit calculating and adjusting the overlapping range with another local cluster.

The overlapping range calculation unit may determine on or off of the beam determination binary indicator for each beam direction by further considering an energy detection threshold value derived based on a sensing probability for the primary terminal.

The adjustment unit may broadcast sensing information of the local cluster to another cluster, and calculate an overlapping range for a channel for detecting the same primary terminal, and then adjust on or off of the beam determination binary indicator.

A semi-distributed spectrum sensing method in cognitive IoT networks and an apparatus thereof according to an embodiment of the present disclosure may have performance close to a centralized sensing technology through an inter-cluster mediation step after converting a wireless cognitive network system from a centralized spectrum sensing model to a distributed spectrum sensing model by clustering a wireless cognitive network system into a plurality of clusters.

Further, the present disclosure has an advantage in that when occurring a problem in a local cluster leader, it may be replaced with another secondary terminal through semi-distributed spectrum sensing to have flexibility.

In addition, the present disclosure also an advantage of being able to increase overall network frequency resource efficiency.

BRIEF DESCRIPTION OF THE DRAWINGS

FIG. 7 is a diagram illustrating a pseudo code for clustering to a local cluster according to an embodiment of the present disclosure.

FIG. 9 is a diagram illustrating a pseudo code for a method for finding the overlap range according to an embodiment of the present disclosure.

FIG. 11 is a diagram illustrating a pseudo code for a modified elimination method for a P2 solution according to an embodiment of the present disclosure.

FIG. 12 is a diagram illustrating a pseudo code for an adjustment method between local clusters according to an embodiment of the present disclosure.

DETAILED DESCRIPTION

Singular forms used in the present specification may include plural forms unless the context clearly indicates otherwise. In the present specification, a term such as "composed of" or "include," and the like should not be construed as necessarily including all of various components or various steps disclosed in the present specification, and it should be construed that some component or some steps among them may not be included or additional components or steps may be further included. In addition, the terms "part', "module", and the like disclosed in the specification refer to a processing unit of at least one function or operation and this may be implemented by hardware or software or a combination of hardware and software.

Hereinafter, embodiments of the present disclosure will be described in detail with reference to the accompanying drawings.

Figure 1:
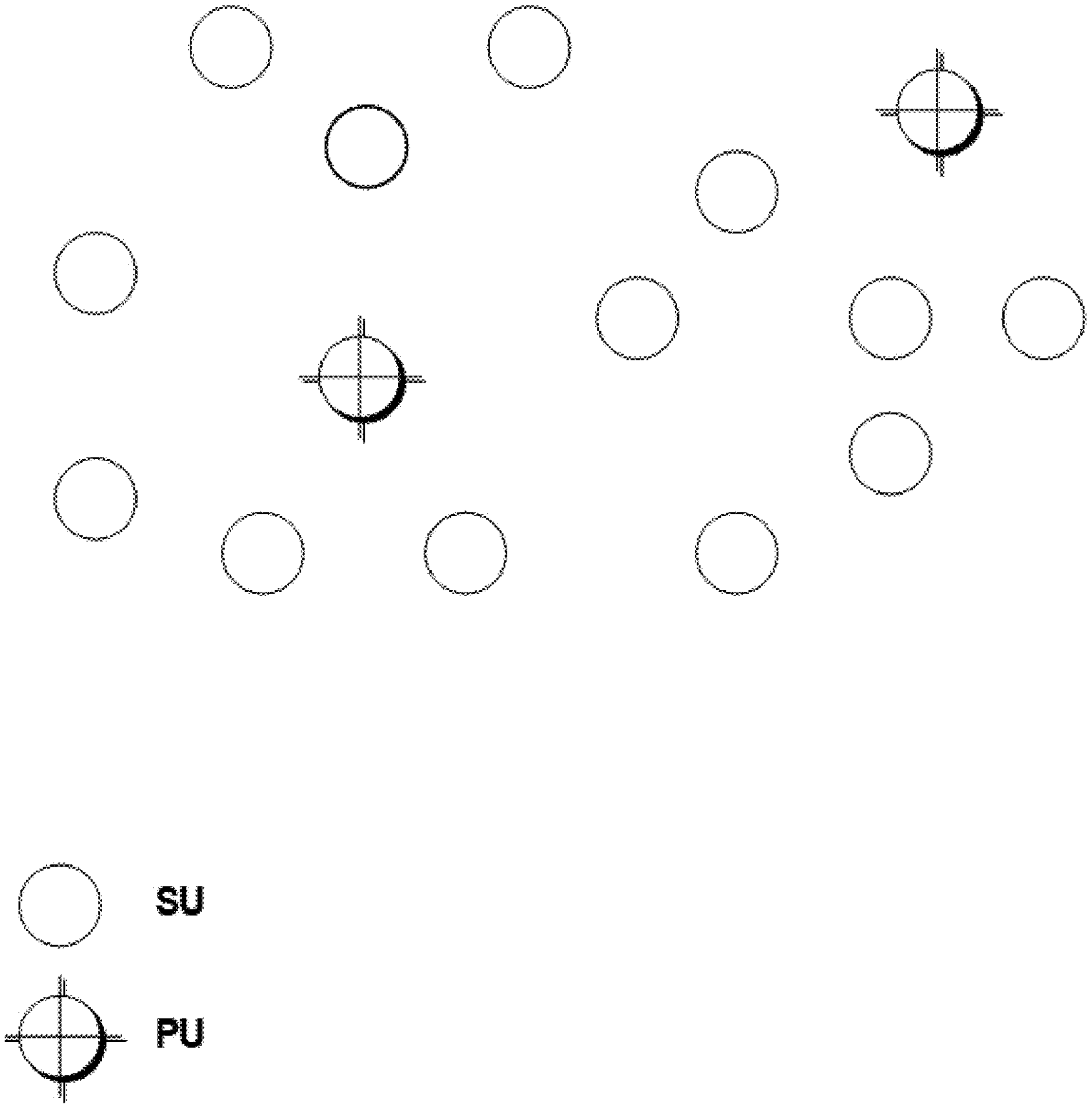
FIG. 1 is a diagram schematically illustrating a wireless cognitive network system according to an embodiment of the present disclosure.
Figure 2:
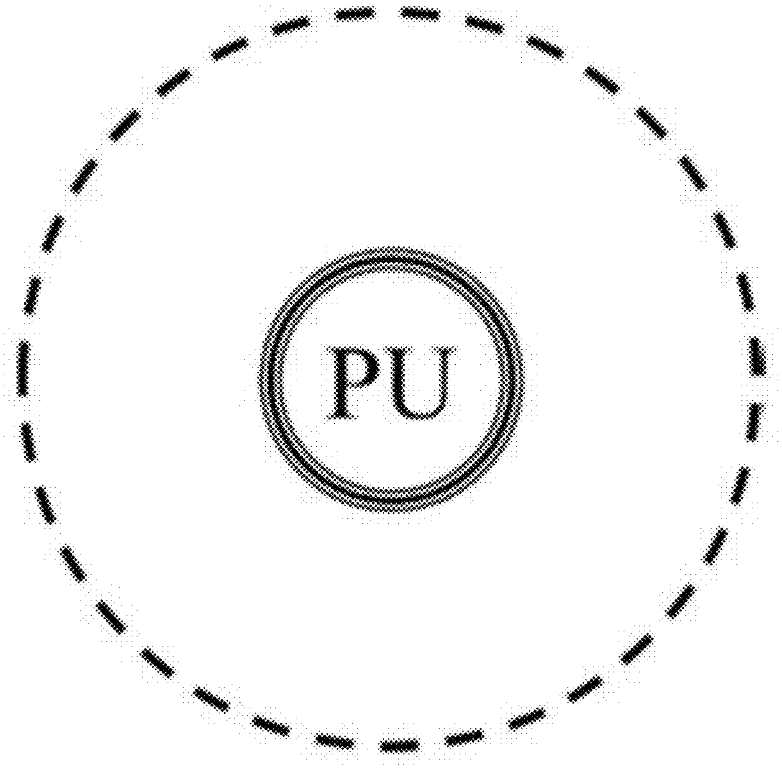
FIG. 2 is a diagram illustrating an antenna model of a PU according to an embodiment of the present disclosure.
Figure 3:
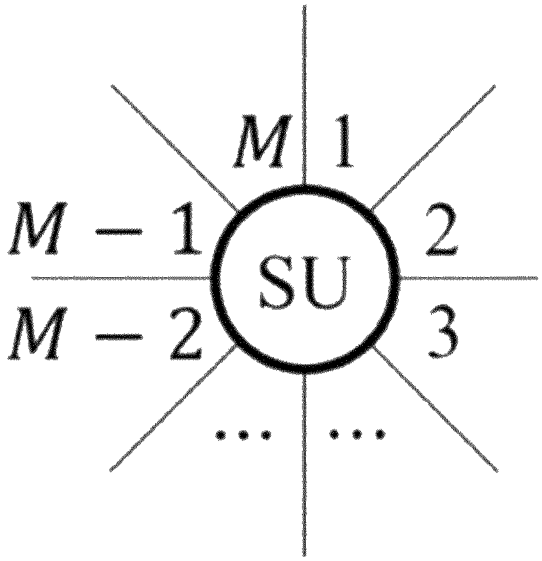
FIG. 3 is a diagram illustrating an antenna model of an SU according to an embodiment of the present disclosure.

FIG. 1 is a diagram illustrated to describe a wireless cognitive network system according to an embodiment of the present disclosure, FIG. 2 is a diagram illustrating an antenna model of a PU according to an embodiment of the present disclosure, and FIG. 3 is a diagram illustrating an antenna model of an SU according to an embodiment of the present disclosure.

The wireless cognitive network system may be constituted by a plurality of nodes. The nodes may be fixed or moved, and may be mobile station (MS), mobile terminal (MT), user terminal (UT), subscriber station (SS), wireless device, personal digital assistant (PDA), wireless modem, handheld device, access point, Euro Wi-Fi, base station, etc.

Some of the nodes constituting the wireless cognitive network system may be a primary unit or terminal (PU) (hereinafter referred to as PU), and the remaining may be a secondary unit or terminal (SU) (hereinafter referred to as SU).

A semi-distributed spectrum sensing method in the cognitive IoT network according to an embodiment of the present disclosure relates to a method for detecting a case where SUs do not occupy radio resources of Pus having a use priority.

For promoting convenience of understating and description, PU and SU will be described in brief.

The PU has a license for the corresponding spectrum of the radio resource, and is a node having a priority when using the corresponding spectrum. Occupancy of the radio resource by the PU may be dynamically generated in spatial and temporal dimensions.

As illustrated in FIG. 2, it is assumed that an omnidirectional antenna is mounted on the PU. Further, it is assumed that the PU periodically broadcasts a pilot signal as in Digital Video Broadcasting-Terrestrial (DVB-T) of IEEE 802.22 which is a standard of a wireless regional area network (WRAN) using a white space band, a TV frequency band.

In the wireless cognitive network system according to an embodiment of the present disclosure, N SUs are present, and an i-th SU will be denoted as $SU_i$.

The SU as a node which does not have permission for the corresponding spectrum of the radio resource should find and use a spectrum which is not used by the PU. As such, SUs which do not have a spectrum use priority for the radio resource should concede spectrum use to the PU when the PU intends to use the corresponding spectrum even while transmitting data.

Therefore, the SUs should periodically perform sensing for the spectrum.

Hereinafter, the present disclosure relates to a semi-distributed spectrum sensing method for efficiently performing the sensing, and this will be clearly understood by the following descriptions.

It is assumed that as illustrated in FIG. 3, each of the SUs includes a directional antenna having M directional beam directions and M is a natural number of 2 or greater. Further, it is assumed that the SUs are fixed to a static position without positional movement.

Further, it is assumed that the respective SUs exchange local information through initial setting such as exchange of a 'Hello' message to know information of neighboring nodes such as the number, a position and a beam angle of the neighboring node.

Further, the directional antenna having M directional beam directions mounted on the SUs may switch a transmission mode and a reception mode by using a controller. In this case, switching of the controller may be implemented based on a fast time of less than 217 ns, and very fast analog CMOS multiplex and diplexer with less than a signal propagation delay.

It is assumed that each side lobe of the SUs is much smaller than a main lobe. That is, the side lobe may be disregarded, and it will be regarded that respective beam patterns are not ideally overlapped. It is assumed that respective beams have the same angle $$\theta = \frac{2\pi}{M}.$$

A permission band of the PU may be split into K channels, and the SU may transmit/receive data by using K data channels opportunistically. In order to use the data channel of the PU, the SU should identify a spectrum hole by sensing K channels. It is assumed that the SUs use a dedicated control channel in order to share acquired information with each other. It is assumed that as a communication protocol for the dedicated control channel between the SUs, LoRa is used, which is a kind of low-power wide-area network (LPWN) technology having low power, a wide communication range, and multiple detection functions.

Hereinafter, a semi-distributed cooperative spectrum sensing method in a wireless cognitive network system will be described.

Figure 4:
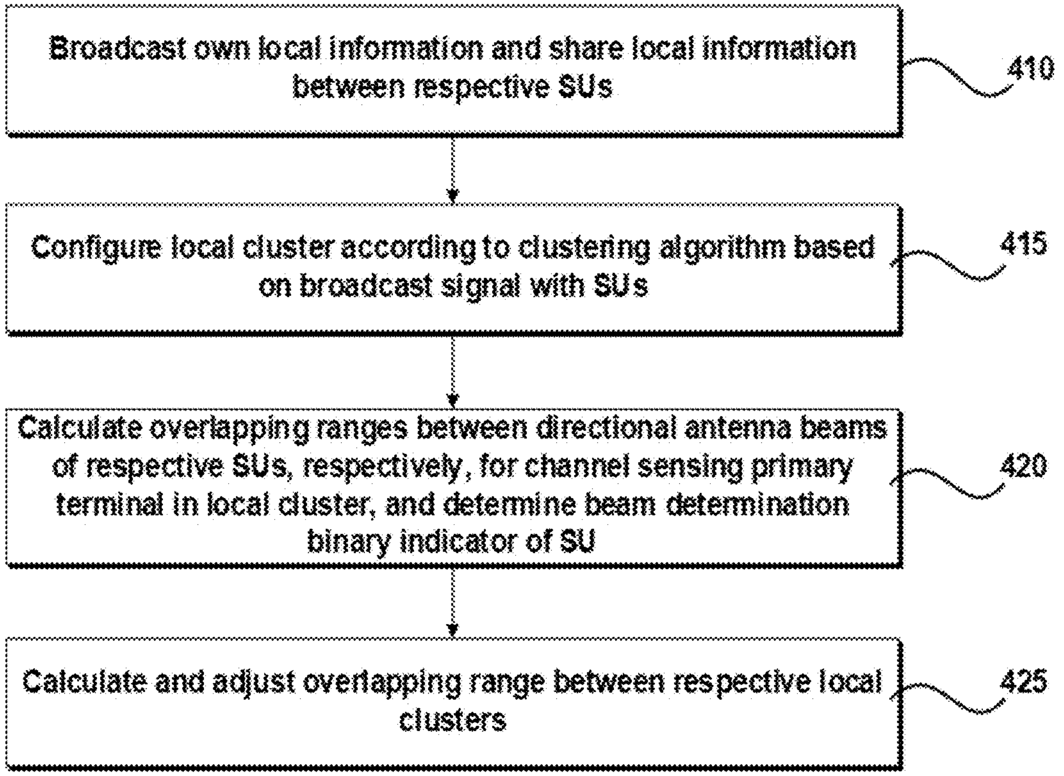
FIG. 4 is a flowchart illustrating a semi-distributed spectrum sensing method in cognitive IoT networks according to an embodiment of the present disclosure.
Figure 5:
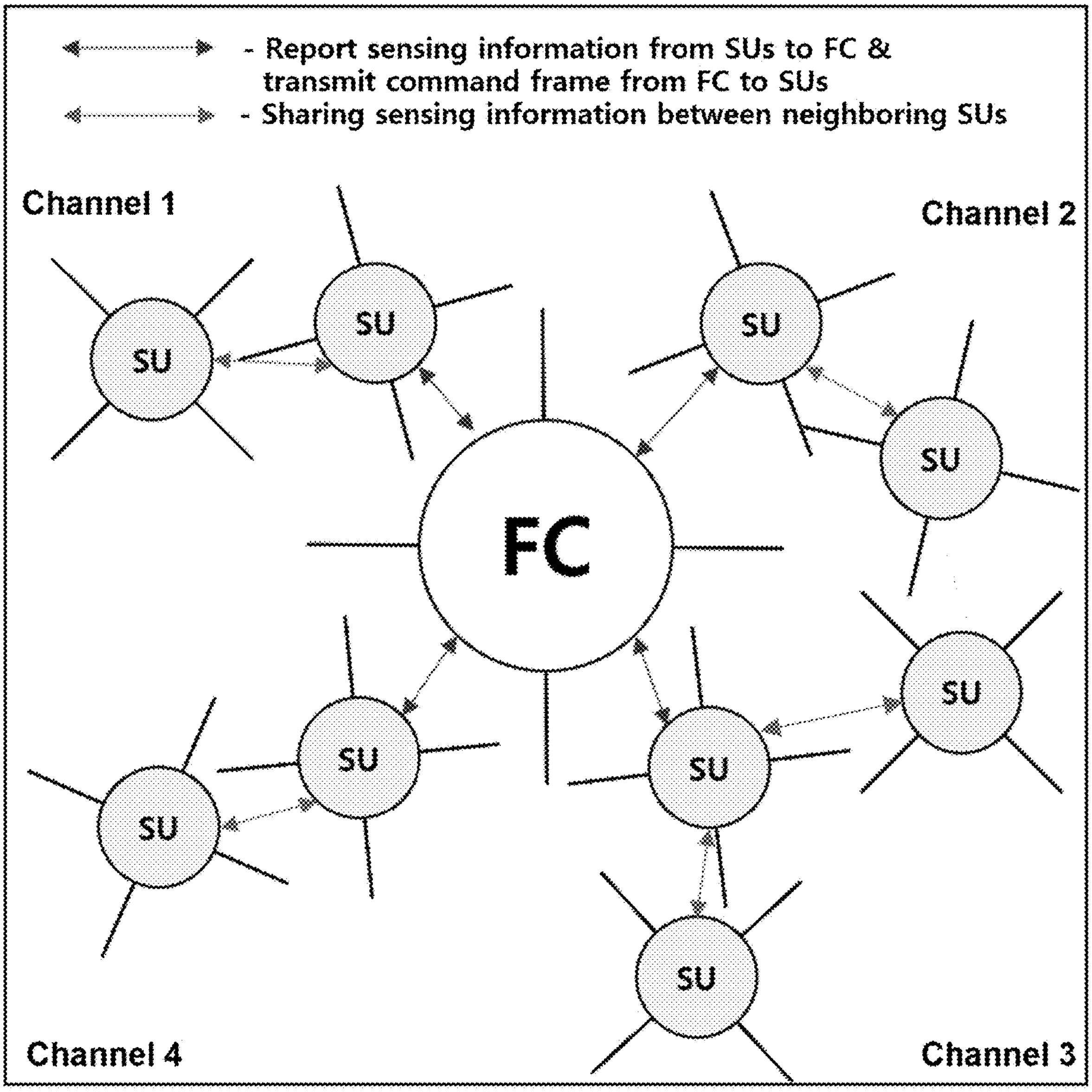
FIG. 5 is a diagram illustrating a centralized spectrum sensing model in the related art.
Figure 6:
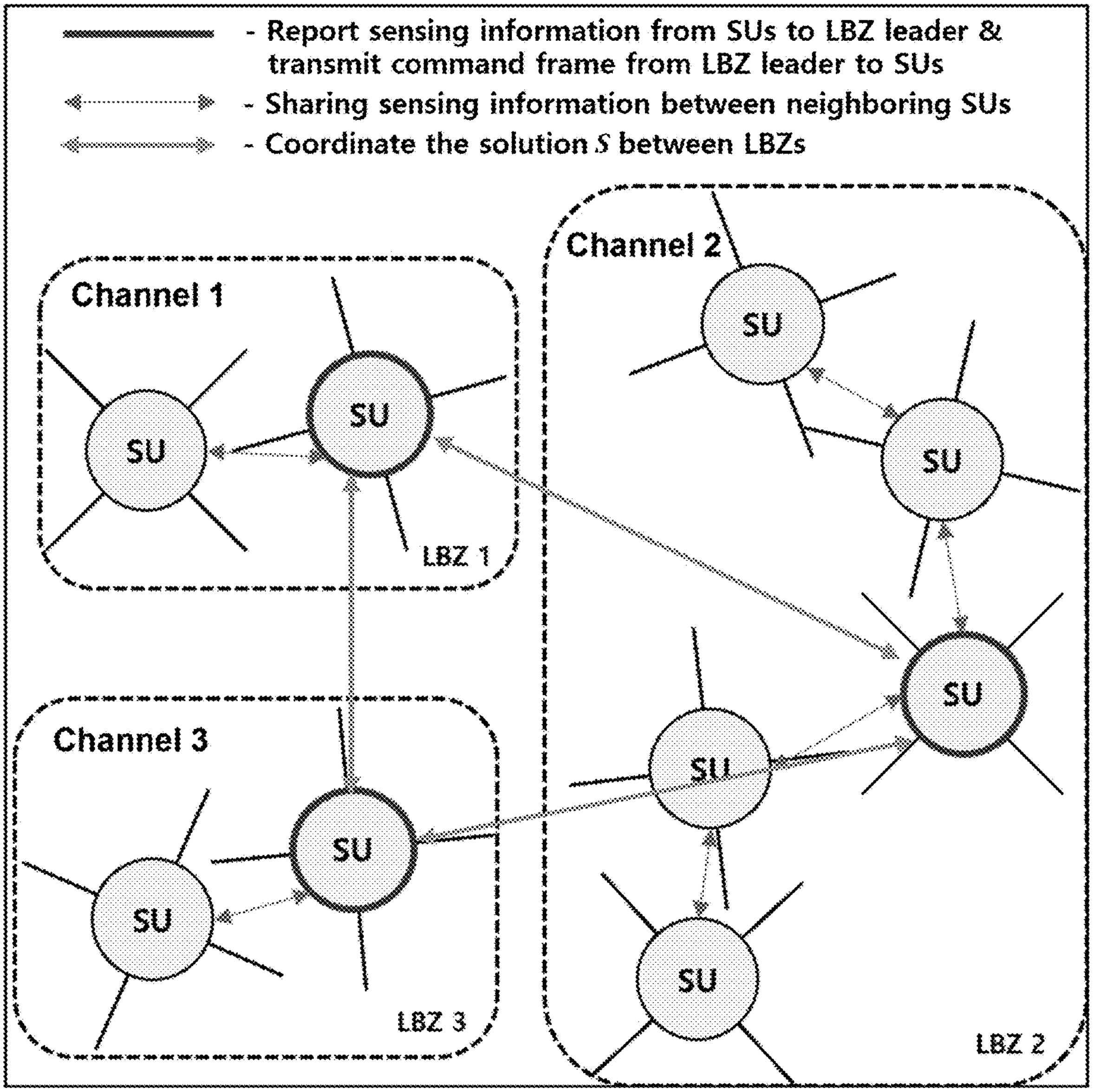
FIG. 6 is a diagram illustrated to describe a semi-distributed spectrum sensing model according to an embodiment of the present disclosure.
Figure 8A:
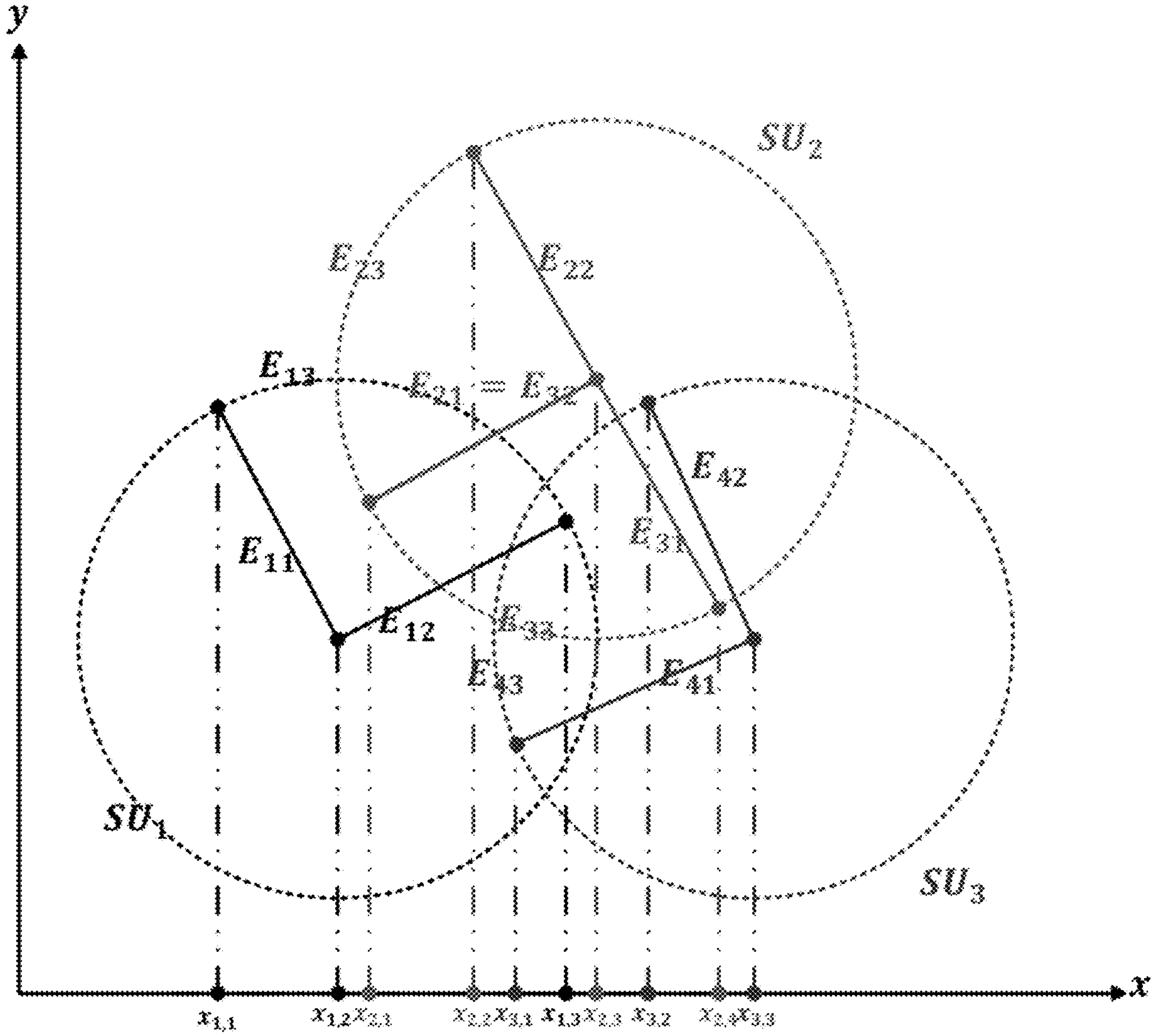
FIGS. 8A and 8B are diagram illustrated to describe an overlap range according to an embodiment of the present disclosure.
Figure 8B:
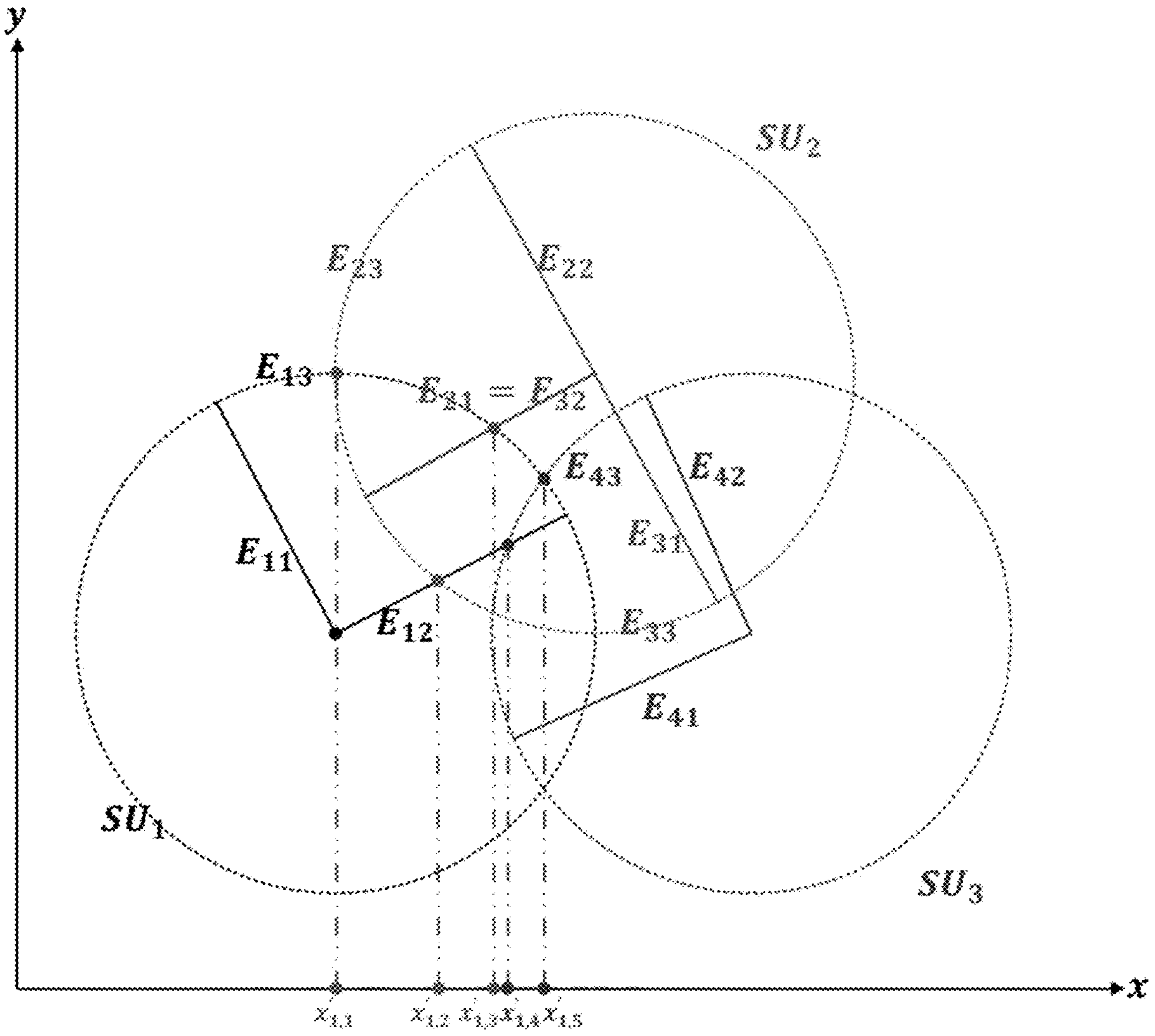
Figure 10:
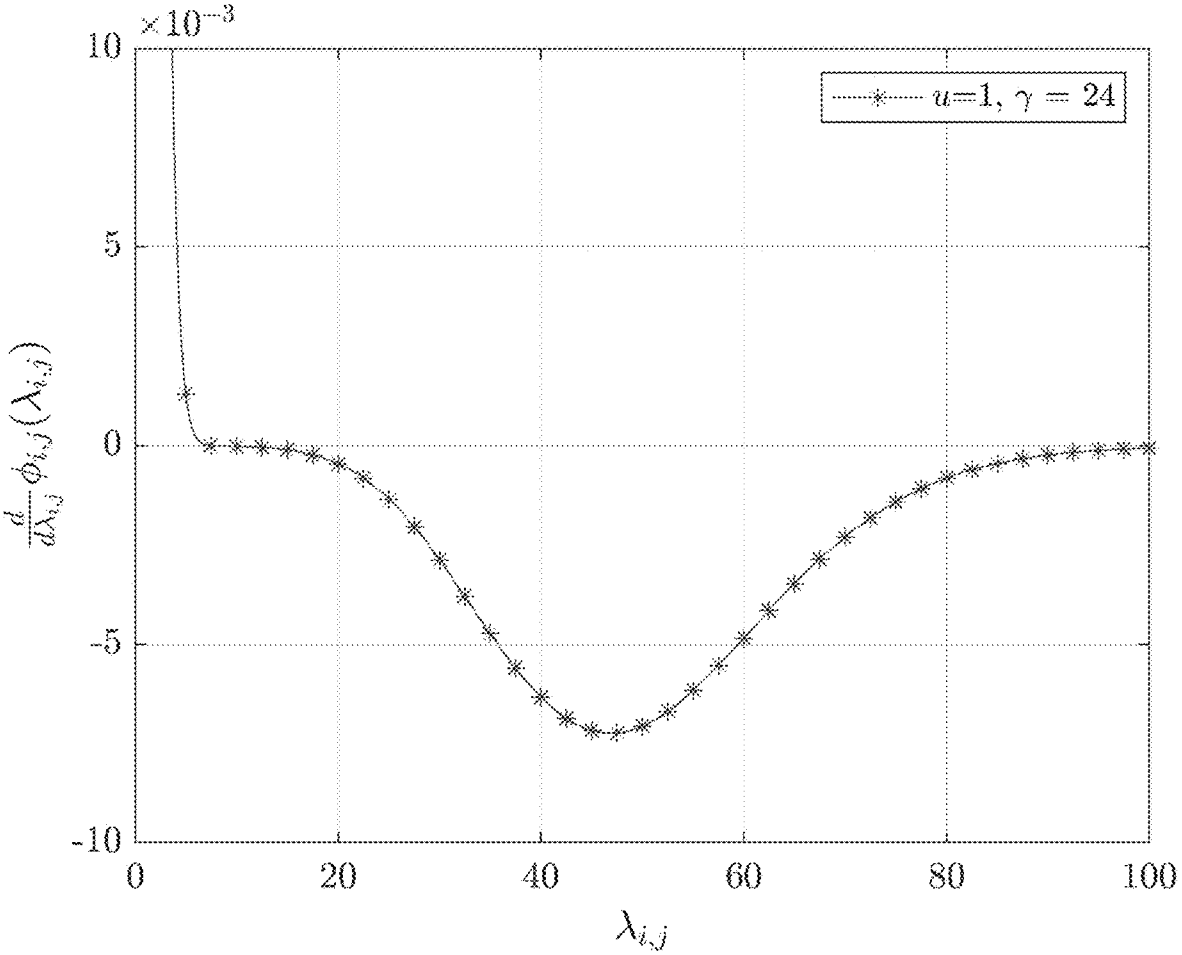
FIG. 10 is a diagram illustrated to describe a primary derivative of $\Phi_{i,j}(\Delta_{i,j})$ according to an embodiment of the present disclosure.
Figure 13A:
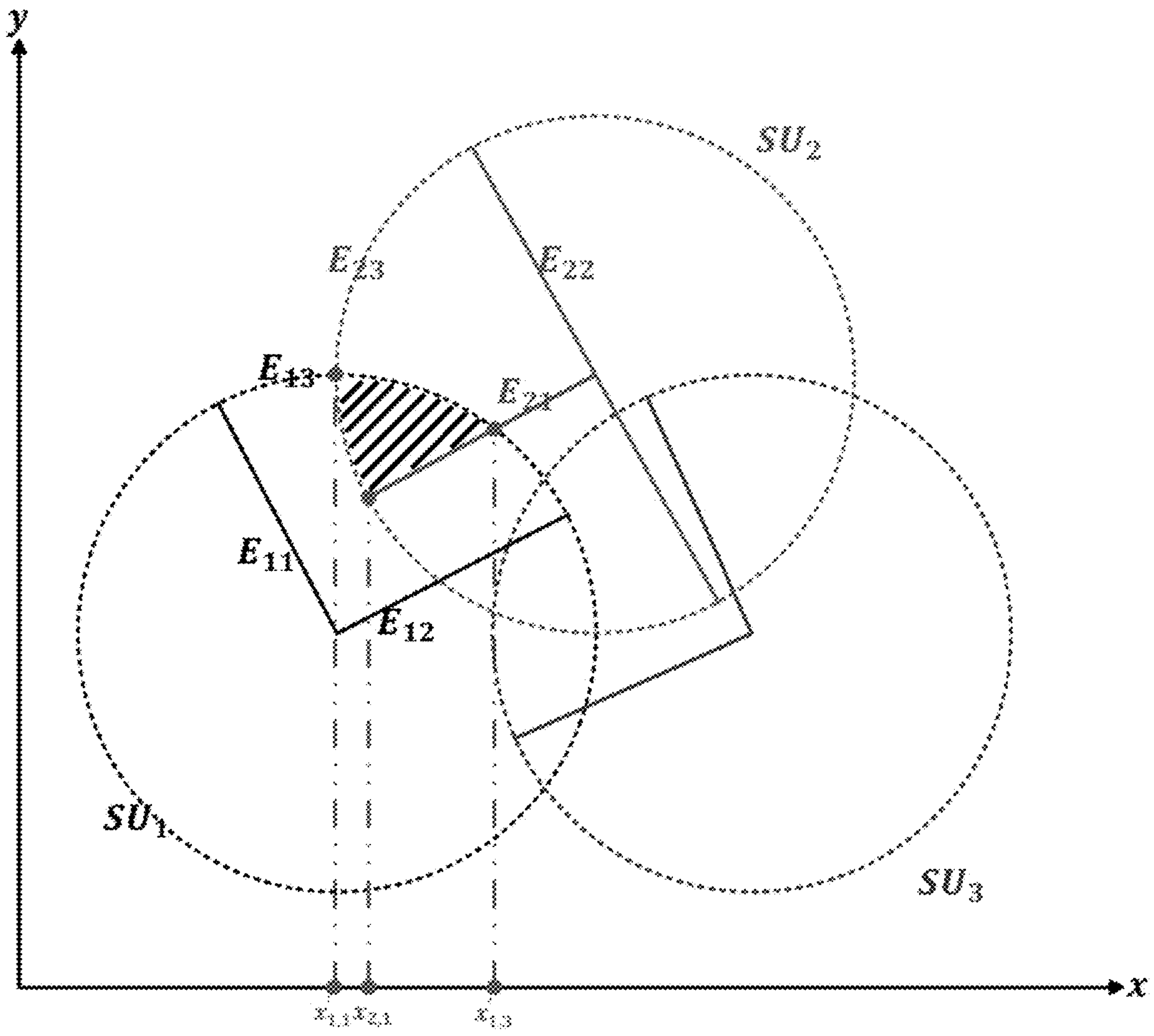
FIGS. 13A to 13C are diagrams illustrated to describe OBCR calculation of FIGS. 8A and 8B.
Figure 13B:
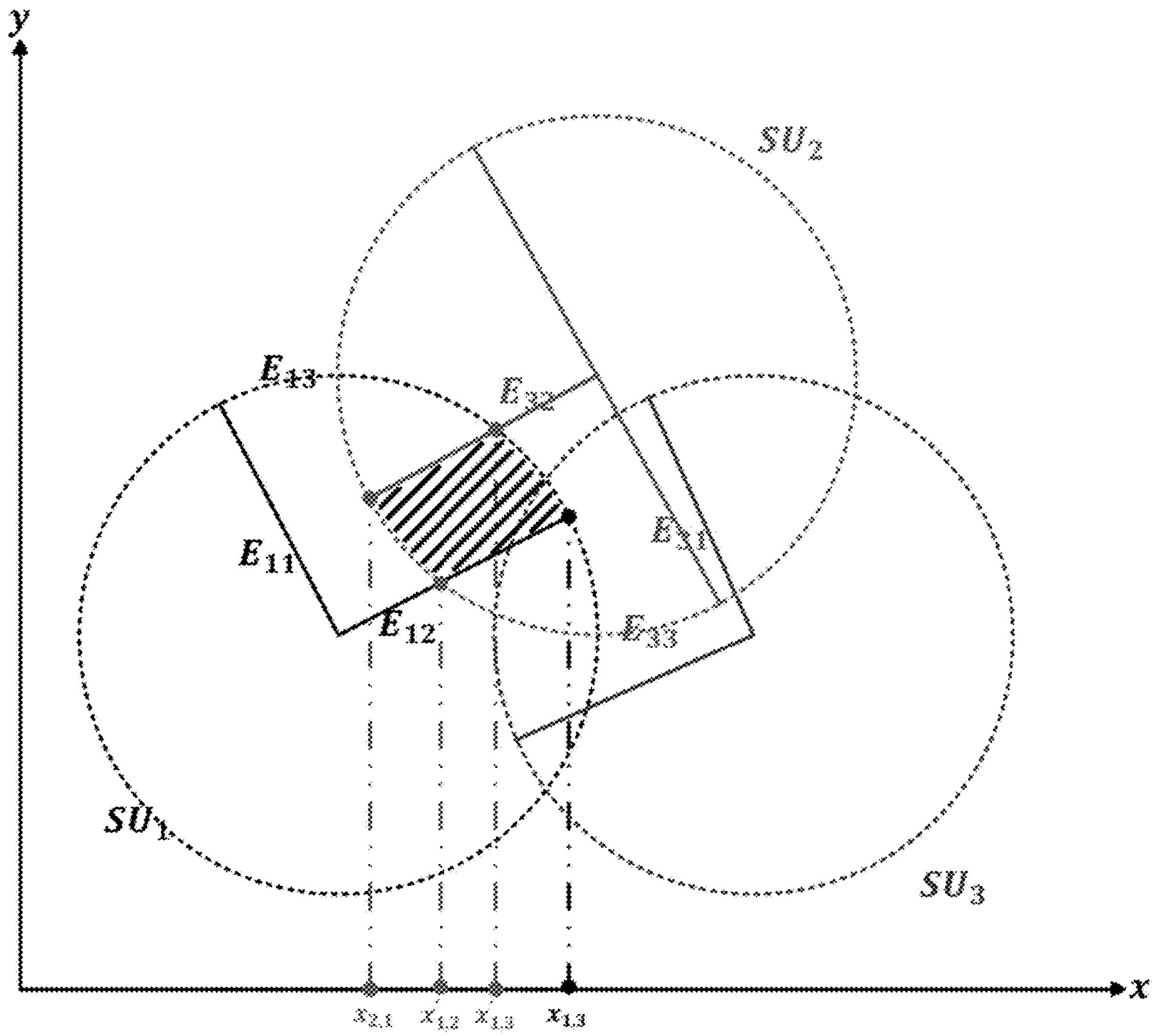
Figure 13C:
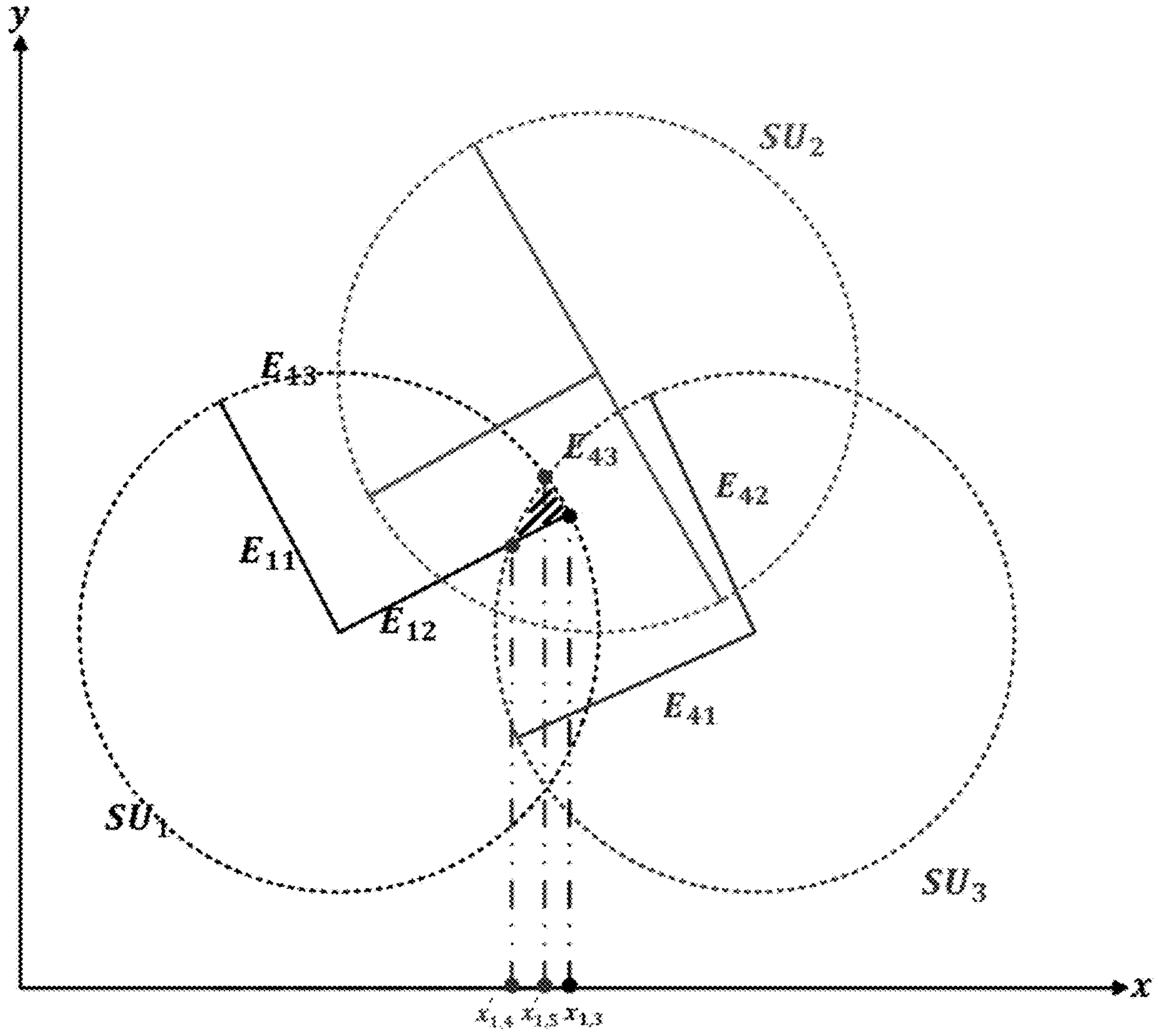

FIG. 4 is a flowchart illustrating a semi-distributed spectrum sensing method in a wireless cognitive network system according to an embodiment of the present disclosure, FIG. 5 is a diagram illustrating a centralized spectrum sensing model in the related art, FIG. 6 is a diagram illustrated to describe a semi-distributed spectrum sensing model according to an embodiment of the present disclosure, FIG. 7 is a diagram illustrating a pseudo code for clustering to a local cluster according to an embodiment of the present disclosure, FIGS. 8A and 8B are diagram illustrated to describe an overlap range according to an embodiment of the present disclosure, FIG. 9 is a diagram illustrating a pseudo code for a method for finding the overlap range according to an embodiment of the present disclosure, FIG. 10 is a diagram illustrated to describe a primary derivative of $\Phi_{i,j}(\lambda_{i,j})$ according to an embodiment of the present disclosure, FIG. 11 is a diagram illustrating a pseudo code for a modified elimination method for a P2 solution according to an embodiment of the present disclosure, FIG. 12 is a diagram illustrating a pseudo code for an adjustment method between local clusters according to an embodiment of the present disclosure, and FIGS. 13A to 13C are diagrams illustrated to describe OBCR calculation of FIG. 8.

In step 410, the SUs broadcast local information thereof, and share the local information among respective SUs.

In step 415, the SU is clustered to a local cluster according to a clustering algorithm based on the shared local information.

For example, the SU is clustered in units of local cluster based on a distance from neighboring SUs. For example, each local cluster is referred to as localized broadcast zone (LBZ), and this may be defined as in Equation 1:

$$LBZ_k = \{SU_i | D(i, j) < R, \forall i, j \in LBZ_k\} \qquad \text{[Equation 1]}$$

wherein, k represents an index of each local cloud (i.e., LBZ), and D(i,j) represents a distance between $SU_i$ and $SU_j$. A leader is present in each local cloud (i.e., $LBZ_k$), respectively, and all SUs in the same local cloud $LBZ_k$ may transmit sensing information to the leader by using a multi-hop routing scheme. Here, the leader in each local cloud $LBZ_k$ may be selected as any one of the SUs constituting the corresponding local cloud.

The leader may be selected among the SUs constituting each local cloud $LBZ_k$ by considering a computation capability, a resource usage, etc. When the selected leader in each local cloud $LBZ_k$ does not normally operate, any one of the remaining other SUs may also be reselected as the leader.

FIG. 5 is a diagram illustrating a centralized spectrum sensing model in the related art, and FIG. 6 is a diagram illustrating a semi-distributed spectrum sensing model according to an embodiment of the present disclosure. Unlike FIG. 5, as illustrated in FIG. 6, respective SUs are clustered into a plurality of clusters based on a distance between the SUs, and then any one among the SUs in each local cluster is selected to be converted into a semi-distributed spectrum sensing model, thereby increasing sensing performance through an inter-cluster mediation step.

As such, when the SUs are clustered into each local cluster, and then a leader is selected in each local cluster, spectrum sensing in each local cluster may be performed by each leader.

A pseudo code therefor is illustrated in FIG. 7.

In step 420, the SU calculates each of overlap ranges between the directional antenna beams of the respective SUs for a channel sensing a primary terminal in the local cluster to determine a beam determination binary indicator of the SU.

This will be described in more detail.

One of the most important functions in the wireless cognitive network is to efficiently sense an available spectrum which the SU may use without interfering with the PU. As the spectrum sensing method, there are a lot of methods such as energy detection, secondary statistics, statistical pattern recognition, feature template, matching filter, and cyclostationary sensing. However, in order to distinguish a PU signal and other noise, a random sensing period is required. All SUs should be synchronized for guaranteeing the corresponding sensing period, and this is a difficult task when there is no FC. FC (fusion center) is a coordinator that gathers sensing information from SUs, computes the sensing schedule for the SUs, and disseminates parameters to the SUs.

In an embodiment of the present disclosure, since there is no FC, the SUs use energy sensing technology along with random period of asynchronous SUs by using a known cyclostationary pilot pattern of the PU.

An accurate detection probability is evaluated based on two hypotheses $H_0$ and $H_1$.

$H_0$: PU absence (sub channel is not used).

$H_1$: PU presence (sub channel is being used).

In $H_0$ and $H_1$, a false alarm probability $P_{FA}(\cdot)$ and an accurate detection probability $P_{CD}(\cdot)$ may be evaluated as in Equation 2:

$$P_{FA}(\lambda_{i,j}) = P(SU_{i,j} \text{ detects at least one } PU \text{ under } \lambda_{i,j}|H_0) \quad \text{[Equation 2]}$$

$$P_{CD}(\lambda_{i,j}) = P(SU_{i,j} \text{ detects at least one } PU \text{ under } \lambda_{i,j}|H_1)$$

wherein, $\Delta_{i,j}$ represents an energy detection threshold value for the PU signal. The false alarm probability and the accurate detection probability may be represented as in Equations 3 and 4:

$$P_{FA}(\lambda_{i,j}) = \frac{\Gamma\left(u, \frac{\lambda_{i,j}}{2}\right)}{\Gamma(u)} \quad \text{[Equation 3]}$$

$$P_{CD}(\lambda_{i,j}) = Q_1\left(\sqrt{2\Upsilon_{i,j}}, \sqrt{\lambda_{i,j}}\right) \quad \text{[Equation 4]}$$

wherein, $\Gamma(\cdot)$ represents a gamma function, $\Gamma(\cdot,\cdot)$ represents an upper imperfect gamma function, and $Q_1(\cdot)$ represents a normalized Marcum Q function using a primary modified Bessel function.

In Equation 3, $\mu$ represents a sensing time-bandwidth multiplication, and is generally approximated to 1. In Equation 4, $\gamma_{i,j}$ represents a measured signal to noise ratio (SNR) of the PU signal.

For energy sensing, the SU determines whether the PU is present based on energy detection at a constant sensing cycle $T_s$. Therefore, the accurate sensing probability may be derived as in Equation 5:

[Equation 5]

$$\Phi_{i,j}(\lambda_{i,j}) = (1 - P_{FA}(\lambda_{i,j}))P(H_0) + P_{CD}(\lambda_{i,j})P(H_1),$$
$$= \left(1 - \frac{\Gamma\left(1, \frac{\lambda_{i,j}}{2}\right)}{\Gamma(1)}\right)P(H_0) + Q_1\left(\sqrt{2\Upsilon_{i,j}}, \sqrt{\lambda_{i,j}}\right)P(H_1)$$

wherein, $P(H_0)$ and $P(H_1)$ represent probabilities of hypotheses $H_0$ and $H_1$ during the sensing period, respectively. $P(H_0)+P(H_1)=1$ is satisfied.

When a sensing beam which is largely overlapped with a neighboring beam area is turned on, a lot of sensing beams do not need to perform beam sensing, so sensing energy may be saved as much. That is, when one beam is turned on, it should be estimated how large one beam is overlapped with areas of other beams, and an overlapping degree is defined as an overlapping beam coverage ratio (hereinafter referred to as OBCR).

In order to determine the OBCR, an overlapping point between directional beam sectors of SUs in the same local cluster is determined. Information on an overlapping point between specific $SU_{i,j}$ and other beam $SU_{m,n}$ in the same local cluster may be expressed as $I_{i,j}(m, n)$, and represented as in Equation 6:

$$I_{i,j}(m, n) = \{i_d | i_d = (p_d, q_d, E_d^U, E_d^L)\}. \quad \text{[Equation 6]}$$

wherein, $i_d$ represents a d-th overlapped subinterval region $(p_d, q_d)$ in which upperlimit $$E_m^U$$

and lowerlimit $$E_m^L$$

are present.

For example, $i_d$ will be described with reference to FIGS. 8A and 8B. In FIGS. 8A and 8B, information on an overlapping point of $SU_{11}$ may be represented as in Equation 7:

$$I_{L1}(2, 2) = \{(x'_{1,1}, x_{2,1}, E_{13}, E_{23}), (x_{2,1}, x'_{1,2}, E'_{21}, E_{23})\} \quad \text{[Equation 7]}$$

$$I_{1,1}(2, 2) = \{(x_{2,1}, x'_{1,2}, E_{32}, E_{23}), (x'_{1,2}, x'_{1,3}, E_{32}, E_{13}), (x'_{1,3}, x_{1,3}, E_{12}, E_{33})\}, \quad \text{[Equation 8]}$$

$$I_{1,1}(3, 4) = \{(x'_{1,4}, x'_{1,5}, E_{43}, E_{12}), (x'_{1,5}, x_{1,3}, E_{43}, E_{13})\}$$

Information on the overlapped subinterval may be found, and then OBCR $\psi_{i,j}$ for each beam sector may be calculated as in Equation 8 (see FIGS. 13A to 13C):

$$\Psi_{i,j} = \frac{1}{A_{i,j}} \sum_{m=1}^{|LBZ_k|} \sum_{n=1}^{M} \sum_{d=1}^{|I_{i,j}(m,n)|} \int_{p_d}^{q_d} \left[E_d^U(x) - E_d^L(x)\right] dx \quad \text{[Equation 8]}$$

wherein, $A_{i,j}$ represents a region of $SU_{i,j}$.

A pseudo code for a method for finding the overlapping point is illustrated in FIG. 9.

An embodiment of the present disclosure aims to maximize the accurate detection probability and the OBCR in order to reduce energy consumption as possible. That is, a maximization function of the wireless cognitive network system may be represented as in Equation 9:

$$\sum_{i=1}^{N} \sum_{j=1}^{M} s_{i,j}\{\alpha \Phi_{i,j}(\lambda_{i,j}) + \beta \Psi_{i,j}\} \quad \text{[Equation 9]}$$

wherein, $\alpha$ and $\beta$ represent weight coefficients, which are $\alpha+\beta=1$ and $\alpha, \beta \in [0, 1]$, respectively.

In Equation 10, a PU detection threshold value $\lambda_{i,j}$ may be optimized by using $\lambda_{min}$ and $\lambda_{max}$ as a minimum threshold value and a maximum threshold value, respectively:

$$\lambda_{min} \leq \lambda_{i,j} \leq \lambda_{max} \quad \text{[Equation 10]}$$

The beam determination binary indicator may be represented as $s_{i,j}$, and $s_{i,j}$ may be optimized. When a beam $s_{i,j}$ is used for spectrum sensing, its value may be set to 1, otherwise, the value may be set to 0. That is, all $s_{i,j}$ may be represented as binary integer type variables as in Equation 11:

$$s_{i,j} \in (0, 1), \forall i, j \quad \text{[Equation 11]}$$

As shown in Equation 12, an N×M rare matrix having the overlapping information will be represented as $O_{i,j}$:

$$O_{i,j}(n,m)=\begin{cases}1, & \text{if } SU_{n,m} \text{ is overlapped with } SU_{i,j}\\ 0, & \text{otherwise}\end{cases} \quad \text{[Equation 12]}$$

That is, a matrix element $O_{i,j}(n, m)$ may be represented as 1 when a beam of $SU_{i,j}$ is overlapped with a beam of $SU_{n,m}$.

For energy efficient beam search, only one beam of the beams overlapped with the beams of each $SU_{i,j}$ may be turned on. When this is represented as an equation, it may be represented as in Equation 13:

$$\sum_{n=1}^{N}\sum_{m=1}^{M} S_{n,m}O_{i,j}(n,m)=1\ \forall\, i, j. \quad \text{[Equation 13]}$$

The OBCR of the SUs in each local cluster may be derived, and then $S_{i,j}$ may be optimized based on the derived OBCR. Further, in optimizing S of the SUs in each local cluster, the energy detection threshold value may be further considered.

This will be described.

$\lambda_{i,j}$ is a control variable indicating the energy detection threshold value, and $S_{i,j}$ is a control variable indicating the beam determination binary indicator.

$\Delta_{i,j}$ and $S_{i,j}$ may be represented as $\wedge$ and S which are the N×M matrices, respectively.

When the control variables are represented as the equation, the control variables are shown in Equations 14 and 15:

$$\Lambda=\begin{bmatrix}\lambda_{1,1} & \lambda_{1,2} & \cdots & \lambda_{1,M-1} & \lambda_{1,M}\\ \vdots & & \ddots & & \vdots\\ \lambda_{N,1} & \lambda_{N,2} & \cdots & \lambda_{N,M-1} & \lambda_{N,M}\end{bmatrix} \quad \text{[Equation 14]}$$

$$S=\begin{bmatrix}S_{1,1} & S_{1,2} & \cdots & S_{1,M-1} & S_{1,M}\\ \vdots & & \ddots & & \vdots\\ S_{N,1} & S_{N,2} & \cdots & S_{N,M-1} & S_{N,M}\end{bmatrix}. \quad \text{[Equation 15]}$$

An optimization problem may be summarized as determining an optimal control variable ($\wedge$*, S*) as in Equation 16:

$$(P1)\sum_{\Lambda,S}(9)\ \text{s.t. } (10), (11), (12) \quad \text{[Equation 16]}$$

Equation 16 will be solved by a semi-distribution method. To this end, Equation 16 is decomposed into each local cluster-based local problem, which may be represented as in Equation 17:

$$(P2)\max_{\Lambda,S}\sum_{i\in LBZ_k}\sum_{j=1}^{M} s_{i,j}\{\alpha\Phi_{i,j}(\lambda_{i,j})+\beta\Psi_{i,j}\}\ \text{s.t } (10), (11), (12). \quad \text{[Equation 17]}$$

As shown in Equation 17, the optimization problem may be decomposed into a local problem of each local cluster.

A solution for the local problem in the local cluster may be performed by the leader of each local cluster.

As shown in Equation 17, $S_{i,j}$ is irrelevant to $\Phi_{i,j}(\lambda_{i,j})$. As a result, $s_{i,j}$ and $\lambda_{i,j}$ may be determined separately.

First, in an embodiment of the present disclosure, several properties of the function $\Phi_{i,j}(\lambda_{i,j})$ will be confirmed in order to find the optimal $\lambda_{i,j}$. For simplification, $\Phi_{i,j}(\lambda_{i,j})$ is replaced with $\Phi(\lambda)$, and described.

Proposition 1: There is $\lambda$* which satisfies a primary derivative $$\frac{\partial}{\partial x}\Phi(\lambda^*)=0.$$

Proof: The function $\Phi_{i,j}(\lambda_{i,j})$ is a linear combination of probability density functions (PDFs) of false information $P_{FA}$ and detection omission $1\text{-}P_{CD}$, which is continuous and differentiable.

For convenience, $$x=\frac{\lambda}{2}$$

will be assumed in order to evaluate the derivative $$\frac{\Gamma\left(1,\frac{\lambda}{2}\right)}{\Gamma(1)}.$$

Since $$\Gamma(\mu,x) \text{ is } \int_x^{\infty} t^{\mu-1}e^{-t}dt,$$

a primary partial derivative of $$\frac{\Gamma(1,x)}{\Gamma(1)}$$

may be derived as in Equation 18:

$$\frac{\partial}{\partial x}\frac{\Gamma(u,x)}{\Gamma(u)}\bigg|_{\mu=1}=-\exp(-x) \quad \text{[Equation 18]}$$

Subsequently, by $a=\sqrt{2\gamma}$ and $b=\sqrt{\lambda}$, a primary partial derivative of a momentum Q function $Q_1(\sqrt{2\gamma}, \sqrt{\lambda})$ normalized for convenience is calculated. Then, a primary partial differentiation of $Q_1(a, b)$ is derived.

$$\frac{\partial}{\partial b}Q_1(a,b)=\frac{\partial}{\partial b}\int_b^{\infty} x\exp\left(-\frac{a^2+x^2}{2}\right)I_0(ab)dx=(-b)\exp\left(-\frac{a^2+b^2}{2}\right)I_0(ab) \quad \text{[Equation 19]}$$

wherein, $1_n$ represents a series type n-dimensional modified Bessel function. Therefore, a primary partial derivative of $\Phi$ may be derived as in Equation 20:

$$\frac{\partial}{\partial\lambda}\Phi(\lambda)\Big|_{\mu=1} = \exp\left(-\frac{\lambda}{2}\right) - \lambda^{\frac{1}{2}}\exp\left(-\frac{2\Upsilon+\lambda}{2}\right)I_0\left(\sqrt{2\Upsilon\lambda}\right) = \exp\left(-\frac{\lambda}{2}\right)\cdot\left(1-\sqrt{\lambda}\exp(-\Upsilon)I_0\left(\sqrt{2\Upsilon\lambda}\right)\right). \quad \text{[Equation 20]}$$

Equation 20 may be obtained through various numerical analysis methods in which pole λ* equates as 0 as a constant γ.

The function Φ(λ) also has the following property.

Proposition 2: When λ* is an extreme point, $$\frac{\partial}{\partial\lambda}\Phi(\lambda^*-\epsilon) > 0$$

for ϵ>0 and when $$\frac{\partial}{\partial\lambda}\Phi(\lambda^*+\epsilon) < 0,$$

the function Φ(λ) is concave.

Proof: When Δ*+ϵ is substituted into Equation 20, a discriminant shown in Equation 21 may be derived:

$$\frac{\partial}{\partial\lambda}\Phi(\lambda)|_{\mu=1,\lambda=\lambda^*+\epsilon} = \exp\left(-\frac{\lambda^*+\epsilon}{2}\right) - (\lambda^*+\epsilon)^{\frac{1}{2}}\exp\left(-\frac{2\Upsilon+\lambda^*+\epsilon}{2}\right)I_0\left(\sqrt{2\Upsilon(\lambda^*+\epsilon)}\right) = \exp\left(-\frac{\epsilon}{2}\right)\left\{\exp\left(\frac{\lambda^*}{2}\right) - \lambda^{*\frac{1}{2}}\exp\left(-\frac{2\Upsilon+\lambda^*}{2}\right)I_0\left(\sqrt{2\Upsilon(\lambda^*+\epsilon)}\right) - \epsilon^{\frac{1}{2}}\exp\left(-\frac{2\Upsilon+\lambda^*}{2}\right)I_0\left(\sqrt{2\Upsilon(\lambda^*+\epsilon)}\right)\right\} \quad \text{[Equation 21]}$$

wherein, the primary modified Bessel function $I_0$ increases monotonously in (0, ∞). Therefore, when ϵ is a negligibly small positive value (non-zero), the primary partial derivative of Φ(1) is always a negative number. Similarly, when ϵ is a very small negative number value (non-zero), the primary partial derivative of Φ(λ) is always the positive number. Φ(λ) is concave as in FIG. 10.

Proposition 3: The function Φ(λ) is semi-concave for λ∈(0, ∞).

Proof: The primary partial derivative is always the positive number when λ is smaller than λ*, and the negative number when λ is larger than λ*. Further, according to convergence characteristics of Γ(1, λ) and $Q_1(\gamma_{i,j}, \lambda)$, Φ(λ) converges in the case of Δ→∞. Therefore, the accurate sensing probability Φ(λ) is semi-concave.

Based on the above-described properties, the presence and uniqueness of optimal $\lambda_{i,j}$ may be guaranteed. Therefore, a gradient descent method is used to find the optimal $\lambda_{i,j}$ by modifying a step-size.

The optimal $S_{i,j}$ in Equation 17 may be found based on a constraint condition (Equation 13) for an overlapping information matrix $O_{i,j}$ as illustrated in FIG. 11 by using a removal method modified by using the optimal $\lambda_{i,j}$.

In step 425, each leader (SU) calculates and adjusts the overlapping range between the respective local clusters.

A pseudo code for a process of calculating and adjusting the overlapping range between the local clusters is illustrated in FIG. 12.

In summary, after local sensing for each local cluster, all local clusters broadcast sensing information. Distances between SUs are mutually confirmed for the channel which detects the same PU as the local cluster, and then when the SUs are overlapped, the OBCR of the corresponding beam is compared to turn off a beam having the smaller OBCR. Since an optimization adjustment step between the respective local clusters is performed after optimization for each local cluster, it is concluded that the problem of Equation 13 is solved.

Hereinafter, it should be appreciated that N, K, and M represent the number of SUS, the number of sub channels, and the number of beams for each SU, respectively. Further, a main calculation complexity for clustering the local cluster caused by the formalization of a connection table and calculation of OBCR ψ in each initialization process is O(NlogN). Further, a calculation complexity for finding the optimal λ by the gradient descent method is $O(N^2)$. A calculation complexity for finding the optimal $S_k$ by using a modification elimination method based on linear search is $O(N^2)$.

Each local cluster inspects overlapping with a different local cluster for adjustment between the local clusters, and adjusts on or off of the overlapped beams, and the entire detection and transmission process may be repeated k times with respect to each sub channel.

Therefore, the entire calculation complexity becomes $O(KMN^2)$ which is a polynomial complex number.

Further, it may be assumed that K and M may be extremely smaller than N.

Figure 14:
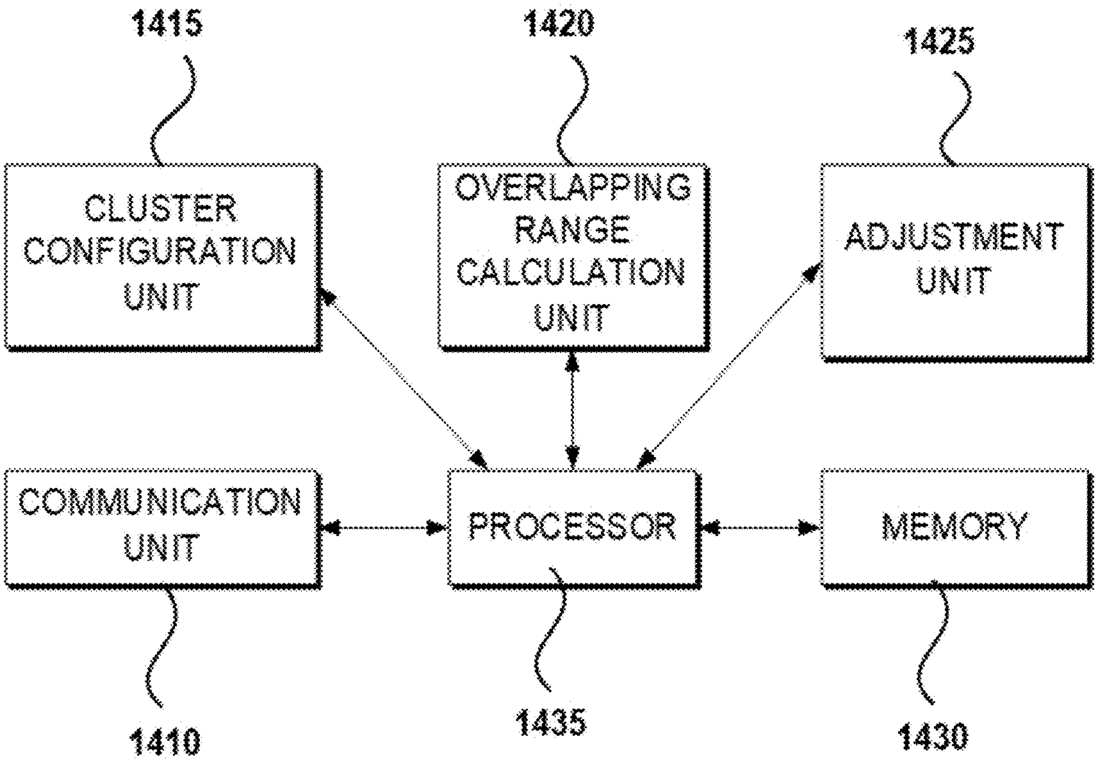
FIG. 14 is a block diagram schematically illustrating an internal configuration of a semi-distributed spectrum sensing apparatus in a wireless cognitive network system according to an embodiment of the present disclosure.

FIG. 14 is a block diagram schematically illustrating an internal configuration of a semi-distributed spectrum sensing apparatus in a wireless cognitive network system according to an embodiment of the present disclosure. Here, the semi-distributed spectrum sensing apparatus may be the SU.

Referring to FIG. 14, the semi-distributed spectrum sensing apparatus in a wireless cognitive network system according to an embodiment of the present disclosure is configured to include a communication unit 1410, a cluster configuration unit 1415, an overlapping range calculation unit 1420, an adjustment unit 1425, a memory 1430, and a processor 1435.

The communication unit 1410 is a means for transmitting and receiving data to and from other devices through a communication network.

For example, the communication unit 1410 may broadcast a 'Hello' message including local information, and also receive the Hello message of other devices.

The cluster configuration unit 1415 configures the local cluster based on a signal acquired in an initial broadcast process.

For example, the cluster configuration unit 1415 may derive distances from other devices (SUs) based on an intensity of the corresponding signal in the broadcast process of the Hello message, and configure the local cluster based thereon.

The overlapping range calculation unit 1420 may generate overlapping point information by calculating an overlapping range between directional antenna beams of other devices (SUs) in the local cluster. Subsequently, the overlapping range calculation unit 1420 may determine each of the beam determination binary indicators for M beam directions to be on or off by using the corresponding overlapping point information.

Further, the overlapping range calculation unit 1420 may determine the beam determination binary indicator by further considering the energy detection threshold value derived based on a sensing probability for a primary terminal in optimizing the beam determination binary indicator.

This is the same as that described with reference to FIG. 4, so a redundant description will be omitted.

The adjustment unit 1425 calculates and adjusts the overlapping range with another local cluster.

For example, the adjustment unit 1425 may broadcast the sensing information of the local cluster to another local cluster, and calculate an overlapping range for a channel for detecting the same primary terminal, and then adjust on or off of the beam determination binary indicator. A series of processes may be repeatedly performed as many times as the number of channels of the primary terminal.

This is the same as that described with reference to FIG. 4, so a redundant description will be omitted.

The memory 1430 stores an instruction for performing the semi-distributed spectrum sensing method in the cognitive IoT networks according to an embodiment of the present disclosure.

The processor 1435 is a means for controlling internal components (e.g., the communication unit 1410, the cluster configuration unit 1415, the overlapping range calculation unit 1420, the adjustment unit 1425, the memory 1430, etc.) of the semi-distributed spectrum sensing apparatus in cognitive IoT networks according to an embodiment of the present disclosure.

The apparatus and the method according to the embodiment of the present disclosure are implemented in a form of a program command which may be performed through various computer means and may be recorded in the computer readable medium. The computer readable medium may include a program command, a data file, or a data structure alone or in a combination thereof. The program command recorded in the computer readable medium may be program instructions specially designed and configured for the present disclosure, or may be program instructions publicly known to and used by those skilled in the computer software field. Examples of the computer-readable recording medium include magnetic media such as a hard disk, a floppy disk, and a magnetic tape, optical media such as a CD-ROM and a DVD, magneto-optical media such as a floptical disk, and a hardware device which is specifically configured to store and execute the program command such as a ROM, a RAM, and a flash memory. An example of the program command includes a high-level language code executable by a computer by using an interpreter and the like, as well as a machine language code created by a compiler.

The hardware device may be configured to be operated with one or more software modules in order to perform the operation of the present disclosure and vice versa.

The present disclosure has been described above with reference to the embodiments thereof. It is understood to those skilled in the art that the present disclosure may be implemented as a modified form without departing from an essential characteristic of the present disclosure. Therefore, the disclosed embodiments should be considered in an illustrative viewpoint rather than a restrictive viewpoint. The scope of the present disclosure is defined by the appended claims rather than by the foregoing description, and all differences within the scope of equivalents thereof should be construed as being included in the present disclosure.

What is claimed is:

1. A semi-distributed spectrum sensing method in cognitive Internet of Things (IoT) networks, comprising:

(a) grouping, based on local information of pre-shared secondary terminals, each secondary terminal into each local cluster;

(b) generating overlapping point information by calculating an overlapping range between directional antenna beams of the respective secondary terminals in each local cluster, and determining a beam determination binary indicator of the each secondary terminal by using the overlapping point information; and (c) calculating and adjusting the overlapping range between the respective local clusters.

2. The method of claim 1, further comprising:

before the step (a), broadcasting, by each of the secondary terminals that constitute a wireless cognitive network system, local information, respectively, wherein the each secondary terminal is fixed to a static position, and includes a directional antenna having M directional beam directions, wherein M is a natural number of 2 or greater.

3. The method of claim 1, wherein in the grouping of the each secondary terminal to each local cluster, the each secondary terminal is grouped into each local cluster based on a distance between the secondary terminals.

4. The method of claim 1, wherein the beam determination binary indicator indicates on or off of a directional beam direction of the each secondary terminal, and only a beam direction of any one of the beams of the respective secondary terminals overlapped in the overlapping range is determined to be on.

5. The method of claim 1, wherein the beam determination binary indicator is determined by further considering an energy detection threshold value derived based on a sensing probability for a primary terminal.

6. The method of claim 1, wherein in the step (c), the each local cluster broadcasts sensing information, and calculates an overlapping range for a channel detecting a primary terminal, and then turns off the beam determination binary indicator of a secondary terminal corresponding to a smaller beam among the overlapped beams.

7. A non-transitory computer readable recording medium recorded with a program code for executing the method of claim 1.

8. A semi-distributed spectrum sensing apparatus in cognitive Internet of Things (IoT) networks, comprising:

a communication circuitry;

a memory storing instructions; and at least one processor configured to execute the instructions to:

group secondary terminals into local clusters based on local information pre-shared among the secondary terminals;

generate overlapping point information by calculating an overlapping range between directional antenna beams of the respective secondary terminals in each local cluster;

determine beam determination binary indicators for M beam directions by using the overlapping point information, wherein M is a natural number of 2 or greater; and calculate and adjust the overlapping range with between the respective local clusters.

9. The semi-distributed spectrum sensing apparatus in cognitive IoT networks of claim 8, wherein the at least one processor is further configured to determine whether each of the beam determination binary indicators for the M beam directions is on or off by further considering an energy detection threshold value derived based on a sensing probability for a primary terminal.

10. The semi-distributed spectrum sensing apparatus in cognitive IoT networks of claim 8, where the at least one processor is further configured to broadcast sensing information of a local cluster to another local cluster, calculate an overlapping range for a channel for detecting the same primary terminal, and then turn off a beam determination binary indicator of a secondary terminal corresponding to a smaller beam among overlapped beams.

* * * * *